United States Patent [19]
Labana et al.

[11] 3,843,594
[45] Oct. 22, 1974

[54] THERMOSET MOLDING POWDERS EMPLOYING GLYCIDYL METHACRYLATE-FUNCTIONAL PREPOLYMERS AND DIPHENOL-EXPOXY RESIN ADDUCTS AND MOLDING THEREOF

[75] Inventors: Santokh S. Labana, Dearborn Heights; Ares N. Theodore, Farmington, both of Mich.

[73] Assignee: Ford Motor Company, Dearborn, Mich.

[22] Filed: Feb. 15, 1974

[21] Appl. No.: 443,181

Related U.S. Application Data

[63] Continuation of Ser. No. 209,342, Dec. 17, 1974, abandoned.

[52] U.S. Cl......... 260/42.18, 260/37 EP, 260/80.72
[51] Int. Cl. ............................................ C08f 45/10
[58] Field of Search.......... 260/42.18, 37 EP, 80.72, 260/86.1 E, 34.2, 40

[56] References Cited
UNITED STATES PATENTS

| | | | |
|---|---|---|---|
| 2,556,075 | 6/1951 | Erickson | 260/80.72 X |
| 2,580,901 | 1/1952 | Erickson et al. | 260/80.72 |
| 2,668,805 | 2/1954 | Greenlee | 260/47 EP X |
| 3,405,088 | 10/1968 | Slocum | 260/41 A |
| 3,652,476 | 3/1972 | Fellers et al. | 260/80.72 X |

OTHER PUBLICATIONS

Lee et al.; Handbook of Epoxy Resins; McGraw–Hill Book Co.; 1967; pages 15–19,20; Sci. Lib. TP 1180 E6L4.

Lee et al.; Epoxy Resins; McGraw–Hill Book Co.; 1957; pages 35–41; Sci. Lib. TP 986 E6L4.

*Primary Examiner*—Lewis T. Jacobs
*Attorney, Agent, or Firm*—Olin B. Johnson; Roger L. May; Keith L. Zerschling

[57] ABSTRACT

Novel thermosetting resin powders which can be molded to form products characterized, in flexural measurement, by high elongation-to-break, high strength and modulus and by a high glass transition temperature are prepared from a mixture of an epoxy-functional prepolymer consisting essentially of acrylic monomers and a hydroxy-terminated crosslinking agent prepared by reacting a diphenol with an epoxy resin to form an adduct having molecular weight in the range of about 700 to about 4,000.

22 Claims, No Drawings

THERMOSET MOLDING POWDERS EMPLOYING GLYCIDYL METHACRYLATE-FUNCTIONAL PREPOLYMERS AND DIPHENOL-EXPOXY RESIN ADDUCTS AND MOLDING THEREOF

This is a continuation of application Ser. No. 209,342, filed Dec. 17, 1971 and now abandoned.

THE INVENTION

This invention relates to self-crosslinking, dry, thermosettable powders suitable for rapid curing during processing as by compression and injection molding and applicable to the production of rigid, tough, structural materials as, for instance, automobile body panels, electrical appliance housings, boat construction, storage tanks, conduits, particularly those for the transmission of heated fluids, etc. and to molded articles produced therefrom.

The thermosets of this invention, after molding, have a glass transition temperature above 90° C., preferably about 120° C. At room temperature (20°–25° C.) these moldings exhibit, in flexural measurement, a strength in the range of about 15,000 to about 30,000 psi or higher, a modulus of about $1.2 \times 10^6$ to about $2.3 \times 10^6$ psi or higher, and elongation-to-break in the range of about 1 to about 3 percent or higher.

Glass transistion temperature is that temperature at which a glass-like material loses its rigidity and hardness and approaches the behavior of an elastomer. More specifically, glass transition temperature is defined as the temperature at which such material shows a maximum in its mechanical damping at low frequencies, e.g., about 1 cycle per second.

I. Composition of the Prepolymer

The prepolymer preferably has at least three constituent monomers and, except for limited substitution as herein after noted, has the following basic composition:

| | | |
|---|---|---|
| glycidyl methacrylate | 15–40, | preferably 20–35 wt. % |
| methacrylonitrile | 0–30, | preferably 10–25 wt. % |
| methyl methacrylate | | balance |

Acrylonitrile may be substituted in whole or in part for the methacrylonitrile but the latter is the preferred reactant in that products produced from prepolymers containing this constituent and the crosslinking agents used herein have a higher heat distortion (glass transition) temperature than do the corresponding products using acrylonitrile, all other factors being equal.

A minor portion of the methyl methacrylate, preferably not more than one-third thereof, may be replaced with styrene, alpha methyl styrene, vinyl acetate or a different ester of acrylic or methacrylic acid and a monohydric alcohol, preferably a $C_2 - C_4$ alcohol, e.g., ethyl acrylate, butyl acrylate, butyl methacrylate, etc. This substitute should not exceed about 15 percent of the total monomers used to form the prepolymer and preferably does not exceed 10 percent of the same. In the case of the $C_4$ substitutes, this component preferably does not exceed one-fifth of the methyl methacrylate. The substitutes mentioned in this paragraph, with the exception of styrene, increase the flexibility of the polymer, i.e., the elongation-to-break factor, and decrease the softening point (glass transistion temperature).

II. Properties of the Prepolymer

The prepolymer has an average molecular weight in the range of about 1,500 to about 16,000, preferably about 2,000 to about 10,000, and more preferably about 3,500 to about 8,000, as determined by vapor phase osmometry using methyl ethyl ketone as solvent. Less than about 5 percent of the molecules thereof should have a molecular weight below about 1,000.

The prepolymer has a softening point above 25° C., preferably in the range of about 50° to about 130° C.

III. Preparation of the Prepolymer

The prepolymer is advantageously formed by solution polymerization using heat, a free radical initiator and an inert solvent. The prepolymer is preferably recovered by coagulation. Hexane, a mixture of hexane and toluene, etc., are suitable for this purpose. It may be recovered by evaporation but if this embodiment is used the product should be washed with a suitable solvent to remove low molecular weight components.

A free radical initiator is dissolved in the combined monomeric reactants and is advantageously employed in an amount equal to about 1 – 4 wt. percent of the combined monomer weight. Conventional free radical initiators are suitable for this purpose, e.g., acylperoxides, peresters, and azo compounds. Specific materials which have been used successfully include 2,2'-azobis (2 -methyl propionitrile) hereinafter termed AIBN, benzoyl peroxide, 5-butyl perbenzoate, and t-butyl peroxypivalate.

As aforementioned, the reaction is carried out in an inert solvent, e.g., toluene or a mixture of toluene and dioxane, etc. Advantageously, the weight of the solvent is equal to or in excess of the combined weight of the reactant and the initiator.

In a preferred method of preparation, the monomeric reactants and the free radical initiator are added in small increments, e.g., dropwise, to the solvent heated to reflux under nitrogen. When addition is complete, initiator in the amount of about 0.1 percent monomer weight is dissolved in a small amount of solvent and added over a period of 20 – 60 minutes. The reflux is then continued for about 2 hours. The prepolymer is then recovered by coagulation. This is preferably effected in the following manner. The reaction solution is further diluted with additional solvent until the prepolymer comprises about 20 to about 30 weight percent of the resultant solution. This solution is then added slowly to a liquid that will effect precipitation of the prepolymer. In this instance, hexane is quite suitable. A fine powder precipitates. This is recovered by filtration, dried, and, if necessary, broken up by rolling or grinding. In addition to the aforedescribed method of prepolymer preparation, the prepolymer can be formed by the well-known techniques of emulsion polymerization, bulk polymerization and suspension polymerization. Suspension polymerization is preferably carried out using water as the suspending medium. Since ionic stabilizers react with glycidyl methacrylate, only nonionic materials may be used for stabilizing the suspension. Polyvinyl alcohol and an alkyl aryl polyether alcohol (Triton X 100 – Rohm & Haas Co.) have been found quite satisfactory. To carry out suspension polymerization, the monomer mixture is added to cooled (about 0°C.) 0.16 percent solution of polyvinyl alcohol in water. The mixture is stirred rapidly and the initiator added over a period of about 30 minutes. The temperature of the reaction mixture is then controlled to remain between 55° and 60°C. for 6 to 8 hours. After cooling to room temperature, the polymer is collected by filtration. Because the polymerization must be carried out below 65°C., only the initiators which are an efficient source of free radicals below this temperature may be used. Suitable initiators for suspension polymerization include 5- butyl peroxypivalate and diisopropyl peroxycarbonate. The molecular weight of the prepolymer can be controlled, among other ways, by using 0.1 to about 2 weight percent (based on monomer weight of a chain transfer agent such as lauryl mercaptan.

IV. Crosslinking Agent

The hydroxy-terminated crosslinking agent used in this invention is an adduct formed by reacting a diphenol with an epoxy resin containing at least two epoxy groups, preferably a diepoxide.

The ratio of diphenol to epoxy resin is selected to obtain adducts having molecular weights in the range of about 700 to about 4,000 and softening points in the range of 40° C. to 140° C. Generally 1.2 to 2.5 moles of diphenol per mole of diepoxy resin is used. The adducts have viscosity at 150° C. of less than 100 poises.

The adduct formation can be facilitated by employing catalysts such as triethylenediamine, imidazole and quarternary ammonium salts such as those hereinafter mentioned with reference to the catalyst for the molding powder mix.

Suitable diphenols include, but not by way of limitation, Bisphenol A, 2,3 dihydroxy naphthalene, 4,4'- sulfonyl diphenol, 1,1'-Bis- (4 hydroxy phenyl) - cyclohexane, 0,0' - Bisphenol, Bis - (4 -hydroxy phenyl) - methane, hydroquinone, etc. The diphenols suitable for this purpose have molecular weights in the range of about 110 to about 500. They consist of carbon, hydrogen and oxygen and may have substituents which do not interfere with crosslinking reaction, e.g., sulfonyl groups, nitro groups, alkylthio groups and halogens.

The epoxy resins have at least two epoxy groups and are preferably a diepoxide. These diepoxides should be liquid at 140° C. or below and have molecular weight in the range of about 200 to about 3,000.

The diepoxide may be an aromatic, an acyclic or a cycloaliphatic diepoxide. Such diepoxides should consist essentially of carbon, hydrogen and oxygen but may have substituents which do not interfere with the crosslinking reactions, e.g., sulfonyl groups, nitro groups, alkylthio groups and halogens.

These diepoxides are well known in the art and many are commercially available. Typical examples include diglycidyl esters of polybasic or dibasic acids as disclosed in U.S. Pat. No. 2,866,767; diglycidyl ethers of dihydric phenols as disclosed in U.S. Pat. Nos. 2,467,171; 2,506,486; 2,640,037 and 2,841,595; diglycidyl ethers of diols as disclosed in U.S. Pat. Nos. 2,538,072 and 2,581,464 and diepoxides obtained by peracid epoxidation of dienes. A collection of suitable diepoxides are illustrated in U.S. Patent Application Ser. No. 43,895, filed June 5, 1970 and these disclosures are incorporated herein by reference. Although the diepoxides are to be preferred for the present invention, low viscosity polyepoxides may also be advantageously used.

In this, the preferred embodiment, the adduct is employed in a concentration which provides about 0.8 to about 1.1 moles of free (unreacted) phenolic hydroxyl per mole of free epoxy in the molding powder.

While the foregoing has described the preferred embodiment wherein reaction (adduct formation) is complete or essentially complete, it is within the scope of this invention to blend the diphenol with the diepoxide under conditions such that adduct formation is achieved in part leaving in the blend a portion of the diphenol unreacted and/or a portion of the diepoxide unreacted.

Advantageously, at least about 10, preferably about 25 to 100, and more preferably about 50 to 100 percent of the epoxy resin is converted to the hydroxy-terminated crosslinking agent.

To obtain suitable viscosity for an effective rate reaction, it is advisable to form the adduct at a temperature at least about 20° C. above the melting point of the epoxy resin. Normally this will be a temperature in the range of about 110°–180° C., more commonly about 120°– 150° C.

In all embodiments, the ratio of the free (unreacted) phenolic hydroxyl groups in the crosslinking agent to the sum of free epoxy groups in the diepoxide and the prepolymer, i.e., free epoxy groups in the prepolymer is in the range of about 0.8 to about 1.2.

V. Catalysts

A catalyst is employed in the molding powder mix to facilitate the crosslinking reaction. Suitable catalysts include quarternary ammonium salts such as tetrabutyl ammonium iodide, bromide and chloride, tetramethyl ammonium chloride, bromide and iodide, benzyl dimethyl ammonium bis (O - phenylenedioxy) phenyl siliconate. Other suitable catalysts include N,N'- dimethyl benzyl amine, imidazole, 2 - ethyl - 4 - methyl imidazole, $BF_3$.MEA (borontrifluoride monoethyl amine complex), triethylene diamine, and metal carboxylates such as lithium benzoate.

Such catalysts are useful at levels of about 0.05 to about 1.0 weight percent of the combined reactants.

These catalysts are found to be latent catalysts for hydroxy-epoxy and epoxy-epoxy reactions. This is to say that the catalysts do not significantly enhance the rate of reaction at room temperature but are effective only above certain temperatures. The catalysts that are latent up to at least 50° C. are preferred.

VI. Preparation of the Molding Powder Mix

The powdered prepolymer, the crosslinking agent and the catalyst are dissolved in a suitable solvent, e.g., acetone, methylene chloride, benzene, etc., and the solution is thoroughly stirred. The solvent is evporated under vacuum leaving a solid cake which is crushed to a fine powder. The powder is further dried under vacuum so that is contains less than one percent of the solvent.

Alternatively, to the prepolymer solution as obtained by polymerization are added crosslinking agent and the catalyst. The solution is stirred until homogeneous and then added slowly to a vigorously stirred precipitating solvent such as hexane. The precipitated powder is dried under vacuum. To ensure its homogeneity, the molding powder is passed through a roll mill at 50° to 100° C. In lieu of employing the precipitation solvent and roll mill, one may merely evaporate the solvent of the prepolymer solution.

Another method of preparing the molding powder consists of mixing together the powdered prepolymer, crosslinking agent, and catalyst and homogenizing by passing through an extrusion mixer or a roll mill.

If desired, reinforcing fillers such as asbestos, glass fibers, clay, calcium carbonate, calcium silicate, etc., may also be incorporated in the molding powders. A particularly effective filler is calcium metasilicate ($CaSiO_3$).

The powders thus prepared are suitable for use in injection molding, compression molding and transfer molding.

This invention will be more fully understood from the following illustrative examples wherein strength properties of the molded specimens are determined by Flexural Test, American Society of Testing & Materials, D 790 — 1966. In this test rectangular bars having thickness one-eighth inch, width 0.500 – 0.600 inch and length 4 inches are used for determining the flexural properties. A table model Instron mechanical testing machine herein for testing. It is set up at a crosshead speed of 0.04 in/min and a recorder chart speed of 2 inches/min. The formulas in procedure B (ASTM — D 790 — 66) are used for the calculation of Flexural Modulus, Elongation-To-Break and Strength.

The prepolymers in the foregoing illustrative examples have softening points between 50° and 110° C. with less than 5 percent of the molecules thereof having molecular weight below 1,000. The reinforced molded articles of these examples exhibit flexural strength above about 15,000 psi, flexural modules above about $1.3 \times 10^6$ psi, elongation-to-break above 1 percent and glass transition temperature above 90° C.

solved in 10 ml. acetone is added over one-half hour period and refluxing is continued for 3 additional hours.

The polymer solution is diluted with 1,500 ml. acetone and coagulated in 5 volumes hexane. The white powder is dried in a vacuum oven at 70° C. for 35 hours. Its molecular weight is $M_w/M_n = 6231/3466$ with a molecular weight per epoxide unit, hereinafter referred to as WPE, of 496.

A phenolic hydroxy terminated resin is prepared in the following manner. A diepoxide, hereinafter described in detail, in the amount of 38.0 grams is charged into a 500 ml stainless steel beaker equipped with a heating mantle. The epoxy resin is heated to 150° C. As the resin is stirred, 45.6 grams of Bisphenol A is added over a 10 minute period. The temperature of the mixture is maintained at 150° C. for 1.5 hours while the mixture is stirred. The reacted mixture is poured out into aluminum pan and cooled. The solid resin, having a molecular weight of 836 is ground to pass through a 60 mesh screen. This phenolic adduct is used for the preparation of molding powder.

The epoxy resin here employed is a commercially available diepoxide having the following properties: liquid at room temperature, epoxide equivalent about 185 to about 192, and average molecular weight of about 380. This diepoxide is represented by the following structural formula wherein n averages less than 1.

The molding powder is made by grinding together 20.0 grams of the glycidyl methacrylate prepolymer,

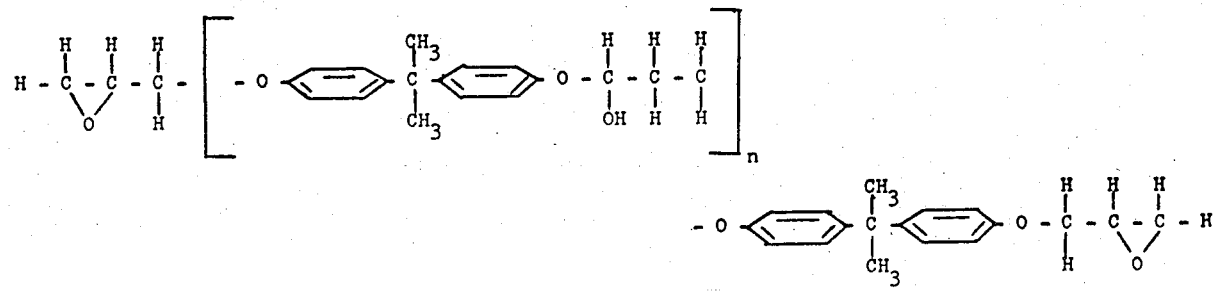

EXAMPLE 1

A prepolymer is prepared from the following components in the manner hereinafter set forth:

| Reactants | Amount (gms.) | Weight Percent |
|---|---|---|
| glycidyl methacrylate | 266 | 31 |
| methyl methacrylate | 435 | 50.5 |
| methacrylonitrile | 159 | 18.5 |

AIBN, i.e., 2,2' - azobis - (2 - methylpropionitrile), in the amount of 3 weight percent of weight of monomer mixture are added slowly into refluxing toluene (975 ml.) which is stirred vigorously under a nitrogen atmosphere. A condenser is provided at the top of the toluene container to condense the toluene vapors and return them to the container. The monomeric mixture is added through a regulating valve and the rate of addition is controlled to maintain a reflux tempperature (108°– 111° C.) with the rest of heat supplied from an external heater. After the addition of the monomer mixture is complete (3 hours), 1.0 gram AIBN dis- 17.0 grams phenolic hydroxy terminated resin and 0.037 grams tetrabutylammonium iodide. After ball-milling the ingredients for 15 hours, 28.0 grams molding powder is combined with 32.0 grams calcium metasilicate ($CaSiO_3$) and ball-milled for 2.0 hours. The powder mix is combined with 20 grams of chopped glass fibers (one-fourth inch average length — this same length is used in all later examples where not otherwise stated) and tumbled for 5 minutes. It is then passed through a tower equipped with a screen in order to achieve good distribution of glass fibers.

The final powder mix, i.e., molding powder, particulate filler and chopped glass fibers, is preformed into a rectangular mold. Then the preform is compression molded at 380°F. for 30 minutes under a pressure of 1,500 psi to form a sheet measuring $4.7 \times 5.2 \times 1/8$ inches — the size of all moldings mentioned in subsequent examples unless otherwise stated. The room temperature flexural properties of the molded sheet are as follows:

| Flexural Strength, psi | Elongation-To-Break, % | Flexural Modulus, psi |
|---|---|---|
| 23,800 | 1.9 | $1.85 \times 10^6$ |

The phenolic hydroxy-terminated resins improve the processability and shelf lives of molding powders relative to those employing diphenols per se as crosslinking agents. The molding powders are dry, free-flowing powders.

This mix is found to be processable after standing at room temperature for 3.5 months.

EXAMPLE 2

The prepolymer of Example 1 in the amount of 20.0 grams, 29.5 grams phenolic adduct and 0.050 gram tetrabutyl ammonium bromide. The phenolic adduct, a phenolic hydroxy terminated resin is made by the same procedure as in Example 1. In this instance 76.0 grams of the diepoxide are reacted with 68.4 grams Bisphenol A in a 500 ml. stainless steel beaker. The resulting resin has average molecular weight of about 1,444. The diepoxide employed is the same diepoxide used in Example 1.

After ball-milling the ingredients for 15 hours, 28.0 grams of the molding powder are combined with 32.0 grams calcium metasilicate ($CaSiO_3$) and 20 grams of chopped glass fibers. This mix is processed and molded using the procedures and conditions of Example 1. This mix is found to be processable after standing at room temperature for 3.5 months.

EXAMPLE 3

The prepolymer of Example 1 in the amount of 20.0 grams, the phenolic adduct in the amount of 41.0 grams and tetrabutyl ammonium chloride in the amount of 0.060 grams are dry blended together.

The phenolic adduct is prepared as in Example 1 with the sole difference being that 114.0 grams of the same diepoxide are reacted with 91.0 grams Bisphenol A in the 500 ml. stainless steel beaker. The resulting Bisphenol A resin has average molecular weight of about 2052.

After ball-milling the ingredients for 15 hours, 28.0 grams of the molding powder are combined with 32.0 grams of calcium metasilicate and 20.0 grams chopped glass fibers. This mix is processed and molded using the procedures and conditions of Example 1.

EXAMPLE 4

The prepolymer of Example 1 in the amount of 20.0 grams, the phenolic adduct in the amount of 15.2 grams, and tetraethyl ammonium iodide in the amount of 0.035 grams are dry blended together.

The phenolic adduct is prepared as in Example 1 with the sole exception being that 38.0 grams of the same diepoxide are reacted with 38.0 grams of 4,4' - biphenol to produce a resin having average molecular weight of about 760.

After ball-milling the ingredients for 15 hours, 28.0 grams of the molding powder are combined with 32.0 grams of calcium metasilicate and 20.0 grams chopped glass fibers. This mix is processed and molded using the procedures and conditions used in Example 1.

EXAMPLE 5

A prepolymer is produced using the same procedure and reactant composition as in Example 1 but the concentration of AIBN is changed to 4 weight percent (basis weight of combined reactants). The resulting copolymer has a molecular weight of about 3,000.

A phenolic hydroxy terminated resin is prepared using the procedure used in Example 1. In this instance there is used a commercially available diepoxide having the same structural formula as that used in Example 1 and the following properties: liquid at room temperature, epoxide equivalent weight of about 172 to about 176 and average molecular weight of about 355. Again, average $n$ is less than 1. This diepoxide in the amount of 35.5 grams reacted with 50.0 grams of dihydroxy diphenyl sulfone and 0.8 grams of tetrabutyl ammonium iodide using the procedure of Example 1 to produce a resin having average molecular weight of about 855.

The molding powder is prepared by dry blending together 20.0 grams of the prepolymer, 17.1 grams of the phenolic hydroxy terminated resin and 0.037 grams of tetraethyl ammonium chloride. This mix is processed and molded using the procedures and conditions used in Example 1.

EXAMPLE 6

The prepolymer of Example 1 in the amount of 20.0 grams is blended with 18.3 grams of phenolic adduct and 0.038 tetramethyl ammonium bromide are dry blended together.

The phenolic adduct is prepared using the procedure of Example 1. The diepoxide used is a commercially available diepoxide having the same structural formula used in Example 1 with n averaging less than 1 and has the following properties: liquid at room temperature, epoxide equivalent about 175 to about 210 and average molecular weight of 380. The adduct is prepared by reacting 38.0 grams of the diepoxide, 54.0 grams 1,1' - Bis - (4 - hydroxyphenyl) cyclohexane and 0.6 grams tetrabutyl ammonium iodide using the proecudre used in Example 1 to produce a resin having average molecular weight of about 916.

After ball-milling the ingredients for 15 hours, 28.0 grams of the molding powder are combined with 32.0 grams of calcium metasilicate and 20.0 grams chopped glass fibers. This mix is processed and molded using the procedures and conditions of Example 1.

EXAMPLE 7

The prepolymer of Example 1 in the amount of 20 grams is dry blended with 14.0 grams of the phenolic adduct and 0.034 tetramethyl ammonium bromide.

The phenolic adduct, a phenolic hydroxy terminated resin is prepared using the procedure of Example 1, 38 grams of the diepoxide of Example 1 and 1,3 - dihydroxy naphthalene to produce a resin having a molecular weight of about 700.

After ball-milling the ingredients for 15 hours, 28.0 grams of the molding powder mix are combined with 32.0 grams of calcium metasilicate and 20.0 grams chopped glass fibers. This mix is processed and molded using the procedures and conditions of Example 1.

EXAMPLE 8

The prepolymer of Example 1 in the amount of 20.0 grams is dry blended with 28.0 grams of the phenolic adduct and 0.048 grams tetramethyl ammonium chloride.

The phenolic adduct, a phenolic hydroxy terminated resin is prepared using the procedure of Example 1. The diepoxide used has the same structural formula of that used in Example 1 with an average $n$ value of 2. This diepoxide has the following properties: melting range 64° – 76° C., epoxide-equivalent about 450 to about 525, and average molecular weight of about 900.

This diepoxide in the amount of 50.0 grams is combined with 40.0 grams of Bis (2-hydroxyphenyl) methane and 0.5 grams tetrabutyl ammonium iodide. The resultant resin has average molecular weight of about 1,400.

After ball-milling the ingredients for 15 hours, 28.0 grams of the molding powder mix are combined with 32.0 grams of calcium metasilicate and 20.0 grams chopped glass fibers. This mix is processed and molded using the procedures and conditions of Example 1.

EXAMPLE 9

The prepolymer of Example 1 in the amount of 20.0 grams are dry blended with 16.3 grams of phenolic adduct and 0.036 grams triethylene diamine.

The phenolic adduct, a phenolic hydroxy terminated resin, is prepared using the procedure of Example 1. The diepoxide employed is the diepoxide used in Example 1. It is employed in the amount of 38.0 grams which are reacted with 44.0 grams of 4,4' - dihydroxydiphenyl sulfide to produce a resin having molecular weight of about 816.

After ball-milling the ingredients for 15 hours, 28.0 grams of the molding powder mix, 32 grams of calcium metasilicate and 20 grams of chopped glass fibers are combined. This mix is processed and molded using the procedures and conditions of Example 1.

EXAMPLE 10

The procedure of Example 1 is repeated with the differences hereinafter noted. A solid diepoxide-Bisphenol A blend is used as the crosslinking agent. The diepoxide used has the same formula as the diepoxide used in Example 1. In this instance, the average number of n is about 2, the epoxide equivalent is about 450 – 525, the melting point is about 64°– 76° C., and the average molecular weight is about 900. In the preparation of this blend, 7.0 grams of the diepoxide are melted and 8.0 grams of Bisphenol A are added to the melt with stirring. In addition, 0.043 grams of tetrabutyl ammonium iodide are also added to the melt. A homogeneous solution is obtained and this is poured into an aluminum plate and cooled. The blend is combined with 28.0 grams of the copolymer of Example 1 and ball-milled for 15 hours. Infrared analysis (11.0$\mu$ absorption) shows essentially no reaction between the diepoxide and the Bisphenol A.

EXAMPLE 11

The procedure of Example 1 is repeated with the differences hereinafter noted. The diepoxide-Bisphenol A adduct-blend that is added to the copolymer as crosslinking agent is prepared in the following manner: The diepoxide used in Example 10 in the amount of 100 grams is melted and 45.6 grams of Bisphenol A and 0.150 grams of tetrabutyl ammonium chloride are added with stirring. The mixture is heated at 120° C. for 1 hour with stirring. The homogeneous solution is poured into an aluminum tray and cooled to room temperature. Forty one (41.0) grams of this adduct-blend are combined with 28.0 grams of copolymer and ball-milled for 15 hours. Infra red analysis (11.02$\mu$ absorption) shows that about 50 percent of the epoxy groups reacted with the Bisphenol A. Twenty eight (28.0) grams of this molding powder is processed and molded using the same procedures and molding conditions used in Example 1.

EXAMPLE 12

The procedure of Example 1 is repeated with the difference that 0.7 equivalents of the phenolic hydroxy terminated resin (crosslinking agent) is employed per equivalent of epoxy functional prepolymer.

EXAMPLE 13

The procedure of Example 1 is repeated with the difference that 1.2 equivalents of the phenolic hydroxy terminated resin (crosslinking agent) is employed per equivalent of epoxy functional prepolymer.

EXAMPLE 14

The preceding examples are repeated with the difference that the copolymer has average molecular weight ($M_n$) of about 1,500. It is prepared using the same procedure and using the same materials used in Example 1 except that 6 weight percent (basis weight of reactants) AIBN is used.

EXAMPLE 15

The preceding examples are repeated with the difference that the copolymer has average molecular weight ($M_n$) of about 5,000. It is prepared using the same procedure and using the same materials used in Example 1 except that 2 weight percent (basis weight of reactants) AIBN is used.

EXAMPLE 16

The preceeding examples are repeated with the difference that the copolymer has average molecular weight (Mn) of about 8,000. It is prepared using the same procedure and using the same materials used in Example 1 except that 1 weight percent AIBN is used.

EXAMPLE 17

The preceding examples are repeated with the difference that the monomers used to prepare the epoxy-functional prepolymer are employed in the following relative amounts:

| | |
|---|---|
| glycidyl methacrylate | 15 wt. % |
| methacrylonitrile | 18.5 do. |
| methyl methacrylate | 66.5 do. |

EXAMPLE 18

The preceding examples are repeated with the difference that the monomers used to prepare the epoxy-functional prepolymer are employed in the following relative amounts:

| | |
|---|---|
| glycidyl methacrylate | 20 wt. % |
| methacrylonitrile | 18.5 do. |
| methyl methacrylate | 61.5 do. |

EXAMPLE 19

The preceding examples are repeated with the difference that the monomers used to prepare the epoxy-functional prepolymer are employed in the following relative amounts:

| | |
|---|---|
| glycidyl methacrylate | 25 wt. % |
| methacrylonitrile | 18.5 do. |
| methyl methacrylate | 56.5 do. |

EXAMPLE 20

The preceding examples are repeated with the difference that the monomers used to prepare the epoxy-functional prepolymer are employed in the following relative amounts:

| | |
|---|---|
| glycidyl methacrylate | 35 wt. % |
| methacrylonitrile | 18.5 do. |
| methyl methacrylate | 46.5 do. |

EXAMPLE 21

The preceding examples are repeated with the difference that the monomers used to prepare the epoxy-functional prepolymer are employed in the following relative amounts:

| | |
|---|---|
| glycidyl methacrylate | 40 wt. % |
| methacrylonitrile | 18.5 do. |
| methyl methacrylate | 41.5 do. |

EXAMPLE 22

The preceding examples are repeated with the difference that the monomers used to prepare the epoxy-functional prepolymer are employed in the following relative amounts:

| | |
|---|---|
| glycidyl methacrylate | 31 wt. % |
| methacrylonitrile | 0 do. |
| methyl methacrylate | 69 do. |

EXAMPLE 23

The preceding examples are repeated with the difference that the monomers used to prepare the epoxy-functional prepolymer are employed in the following relative amounts:

| | |
|---|---|
| glycidyl methacrylate | 31 wt. % |
| methacrylonitrile | 10 do. |
| methyl methacrylate | 59 do. |

EXAMPLE 24

The preceding examples are repeated with the difference that the monomers used to prepare the epoxy-functional prepolymer are employed in the following amounts:

| | |
|---|---|
| glycidyl methacrylate | 31 wt. % |
| methacrylonitrile | 30 do. |
| methyl methacrylate | 39 do. |

EXAMPLE 25

The procedure of Example 1 is repeated with the difference that the monomers used to prepare the epoxy-functional prepolymer are as follows:

| | |
|---|---|
| glycidyl methacrylate | 35 wt. % |
| acrylonitrile | 10 do. |
| methyl methacrylate | 55 do. |

EXAMPLE 26

The procedure of Example 1 is repeated with the difference that the monomers used to prepare the epoxy-functional prepolymer are as follows:

| | |
|---|---|
| glycidyl methacrylate | 25 wt. % |
| acrylonitrile | 25 do. |
| Methyl methacrylate | 50 do. |

EXAMPLE 27

The procedure of Example 1 is repeated with the difference that 25 mole percent of the methacrylonitrile is replaced with an equimolar amount of acrylonitrile.

EXAMPLE 28

The procedure of Example 1 is repeated with the difference that 50 mole percent of the methacrylonitrile is replaced with an equimolar amount of acrylonitrile.

EXAMPLE 29

The procedure of Example 1 is repeated with the difference that 75 mole percent of the methacrylonitrile is replaced with an equimolar amount of acrylonitrile.

EXAMPLE 30

The procedure of Example 1 is repeated with the difference that 25 mole percent of the methyl methacrylate is replaced with an equimolar amount of styrene.

EXAMPLE 31

The procedure of Example 1 is repeated with the difference that 25 mole percent of the methyl methacrylate is replaced with an equimolar amount of alpha methyl styrene.

EXAMPLE 32

The procedure of Example 1 is repeated with the difference that 25 mole percent of the methyl methacrylate is replaced with an equimolar amount of vinyl acetate.

EXAMPLE 33

The procedure of Example 1 is repeated with the difference that 25 mole percent of the methyl methacrylate is replaced with an equimolar amount of the following mixture:

| | |
|---|---|
| styrene | 20 mole % |
| ethyl acrylate | 20 do. |
| butyl acrylate | 20 do. |
| butyl methacrylate | 20 do. |
| 2-ethyl hexyl acrylate | 20 do. |

EXAMPLE 34

The preceding examples are repeated with the difference that the catalyst is employed in the amount of 0.05 wt. percent of the molding powder reactants.

EXAMPLE 35

The preceding examples are repeated with the difference that the catalyst is employed in the amount of 0.25 wt. percent of the molding powder reactants.

EXAMPLE 36

The preceding examples are repeated with the differences that the catalyst is employed in the amount of 0.5 wt. percent of the molding powder reactants.

EXAMPLE 37

The preceding examples are repeated with the differences that the catalyst is employed in the amount of 1 wt. percent of the molding powder reactants.

EXAMPLE 38

The procedure of Example 1 is repeated except for the difference that the tetra butyl ammonium iodide is replaced with an equimolar amount of tetramethyl ammonium chloride.

EXAMPLE 39

The procedure of Example 1 is repeated except for the difference that the tetra butyl ammonium iodide is replaced with an equimolar amount of benzyl trimethyl ammonium iodide.

EXAMPLE 40

The procedure of Example 1 is repeated except for the difference that the tetra butyl ammonium iodide is replaced with an equimolar amount of benzyl dimethyl phenyl ammonium iodide.

EXAMPLE 41

The procedure of Example 1 is repeated except for the difference that equimolar amounts of an aliphatic diepoxide are substituted for the aromatic diepoxide. This aliphatic diepoxide is synthesized in the following manner: to a 2,000 ml, 3-neck flask equipped with stirrer, dropping funnel, thermometer and nitrogen inlet, is added 1 mole of 2,3-butanediol (91.12 gms) and 4 moles of epichlorohydrin (370 gms). The temperature at 110° C. while 2 moles sodium hydroxide (80.0 grams) is added dropwise as a 30 percent aqueous solution. The rate of addition is regulated so that the reaction mixture remains neutral. After about 3 hours, the organic layer is separated, dried, distilled, and a polymer is recovered. This polymeric product is represented by the following structural formula:

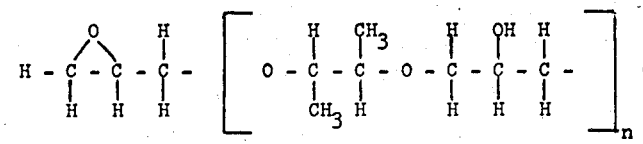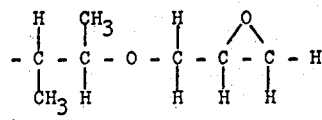

EXAMPLE 42

The procedure of Example 1 is repeated except for the difference that the tetra butyl ammonium iodide is replaced with an equimolar amount of triethylene diamine.

EXAMPLE 43

The procedure of Example 1 is repeated except for the difference that the tetra butyl ammonium iodide is replaced with an equimolar amount of trimethylamine-p-toluene sulfonate.

EXAMPLE 44

The procedure of Example 1 is repeated except for the difference that the tetra butyl ammonium iodide is replaced with an equimolar amount of 2-ethyl-4-methyl imidazole.

EXAMPLE 45

The procedure of Example 1 is repeated with the difference that the tetra butyl ammonium iodide is replaced with an equimolar amount of lithium benzoate.

These examples are illustrative of the invention defined in the appended claims. Those skilled in the art will be aware that modifications can be made in such examples without departing from the scope of the invention as set forth in the general disclosure and the appended claims.

We claim:

1. A molding powder which comprises a particulate, intimate mixture of:
   A. an epoxy-functional copolymer of acrylic monomers
      1. consisting of about 15 to about 40 weight percent glycidyl methacrylate, about 10 to about 30 weight percent methacrylonitrile, and a remainder consisting essentially of methyl methacrylate, and
      2. having an average molecular weight in the range of about 1,500 to about 16,000, with less than 5 percent of the molecules of said copolymer having a molecular weight below 1,000, a softening point above 25°C, and epoxide groups in its molecular structure resultant of inclusion of said glycidyl methacrylate as a constituent monomer thereof, and
   B. a hydroxy-terminated adduct or adduct-blend formed by heating together a mixture which on a catalyst-free basis consists essentially of
      1. a diphenol having molecular weight in the range of about 110 to about 500 and
      2. an epoxy resin that converts from a solid to a liquid at a temperature below about 140°C, has at least two epoxy groups per molecule, and has molecular weight in the range of about 200 to about 3,000 at a temperataure at least 20°C above the melting point of said epoxy resin until at least about 10 percent of said epoxy resin is reacted with said diphenol, the components of said molding powder being employed in such relative proportions that the ratio of free phenolic hydroxyl groups to free epoxy groups in said molding powder is about 0.8 to about 1.2.

2. A molding powder in accordance with claim 1 wherein said copolymer has an average molecular weight in the range of about 2,000 to about 10,000.

3. A molding powder in accordance with claim 1 wherein said copolymer has an average molecular weight in the range of about 3,500 to about 8,000.

4. A molding powder in accordance with claim 1 wherein at least a minor portion but not more than one-third of said methyl methacrylate is replaced with a monomer selected from the group consisting of styrene, alpha-methyl styrene, vinyl acetate and an ester of acrylic or methacrylic acid and a monohydric alcohol other than methanol.

5. A molding powder in accordance with claim 1 wherein said epoxy resin is a diepoxide consisting essentially of carbon, hydrogen and oxygen.

6. A molding powder in accordance with claim 1 wherein said temperature is maintained between about 110°C and about 180°C until at least 25 percent of said diepoxide is reacted with said diphenol.

7. A molding powder in accordance with claim 1 wherein said epoxy-functional copolymer of acrylic monomers consists essentially of about 20 to about 35 weight percent glycidyl methacrylate, about 10 to about 25 weight percent methacrylonitrile and a remainder consisting essentially of methyl methacrylate.

8. A molding powder in accordance with claim 1 wherein particulate reinforcing filler is intimately dispersed with said copolymer and said hydroxy-terminated adduct or adduct blend.

9. A molding powder which comprises a particulate, intimate mixture of:

A. an epoxy-functional copolymer of acrylic monomers
1. consisting of about 20 to about 35 weight percent glycidyl methacrylate, about 10 to about 25 weight percent methacrylonitrile, and a remainder consisting essentially of methyl methacrylate, and
2. having average molecular weight in the range of about 2,000 to about 10,000, with less than 5 percent of the molecules of said copolymer having a molecular weight below 1,000, a softening point above 25°C, and epoxide groups in its molecular structure resultant of inclusion of said glycidyl methacrylate as a constituent monomer thereof, and B. a hydroxy-terminated adduct or adduct-blend formed by heating together a mixture which on a catalyst-free basis consists essentially of
1. a diphenol having a molecular weight in the range of about 110 to 500 and
2. a diepoxide that converts from a solid to a liquid at a temperature below about 140°C and has a molecular weight in the range of about 200 to about 3,000 at a temperature in the range of about 110°C to about 180°C and at least 20°C above the melting point of said epoxy resin until at least about 25 percent of said diepoxide is reacted with said diphenol, the components of said molding powder being employed in such relative proportions that the ratio of free phenolic hydroxyl groups to free epoxy groups in said molding powder is about 0.8 to about 1.2.

10. A molding powder in accordance with claim 9 wherein said copolymer has an average molecular weight in the range of 3,500 to 8,000.

11. A molding powder in accordance with claim 9 wherein at least a minor portion but not more than one-third of said methyl methacrylate is replaced with a monomer selected from the group consisting essentially of styrene, alpha-methyl styrene, vinyl acetate and an ester of acrylic or methacrylic acid and a monohydric alcohol other than methanol.

12. A molding powder in accordance with claim 9 wherein said temperature in the range of about 110°C to about 180°C is maintained until 50 to 100 percent of said diepoxide is reacted with said diphenol.

13. A molding powder in accordance with claim 9 wherein particulate reinforcing filler is intimately dispersed with said copolymer and said hydroxy-terminated adduct or adduct blend.

14. A molded article having a glass transition temperature above 90°C, flexural strength above about 15,000 psi, flexural modulus above about $1.2 \times 10^6$ psi and elongation-to-break above 1 percent and formed from a molding powder which comprises a particulate, intimate mixture of:

A. an epoxy-functional copolymer of acrylic monomers
1. consisting of about 15 to about 40 weight percent glycidylmethacrylate, about 10 to about 30 weight percent methacrylonitrile, and a remainder consisting essentially of methyl methacrylate, and
a. having an average molecular weight in the range of about 1,500 to about 16,000, with less than 5 percent of the molecules of said copolymer having a molecular weight below 1,000, softening point above 25°C, and epoxide groups in its molecular structure resultant of inclusion of said glycidyl methacrylate as a constituent monomer thereof, and B. a hydroxy-terminated adduct or adduct-blend formed by heating together a mixture which on a catalyst-free basis consists essentially of
1. a diphenol having molecular weight in the range of about 110 to about 500 and
2. an epoxy resin that converts from a solid to a liquid at a temperature below about 140°C, has at least two epoxy groups per molecule, and has a molecular weight in the range of about 200 to about 3,000 at a temperature at least 20°C above the melting point of said epoxy resin until at least above 10 percent of said epoxy resin is reacted with said diphenol the components of said molding powder being employed in such relative proportions that the ratio of free phenolic hydroxyl groups to free epoxy groups in said molding powder is about 0.8 to about 1.2.

15. A molded article in accordance with claim 14 wherein said copolymer has an average molecular weight in the range of about 2,000 to about 10,000.

16. A molded article in accordance with claim 14 wherein said copolymer has an average molecular weight in the range of about 3,500 to about 8,000.

17. A molded article in accordance with claim 14 wherein at least a minor portion but not more than one-third of said methyl methacrylate is replaced with a monomer selected from the group consisting of styrene, alpha-methyl styrene, vinyl acetate and an ester of acrylic or methacrylic acid and a monohydric alcohol other than methanol.

18. A molded article in accordance with claim 14 wherein said epoxy resin is a diepoxide consisting essentially of carbon, hydrogen and oxygen.

19. A molded article in accordance with claim 14 wherein said temperature is maintained between about 110°C and about 180°C until at least 25 percent of said diepoxide is reacted with said diphenol.

20. A molded article in accordance with claim 14 wherein said epoxy-functional copolymer of acrylic monomers consists essentially of about 20 to about 35 weight percent glycidyl methacrylate, about 10 to about 25 weight percent methacrylonitrile and a remainder consisting essentially of methyl methacrylate.

21. A molded article in accordance with claim 14 wherein said article contains particulate reinforcing filler which is intimately dispersed with said copolymer and said hydroxy-terminated adduct or adduct blend.

22. A molded article in accordance with claim 14 wherein said article contains glass fibers which are intimately dispersed with said copolymer and said hydroxy-terminated adduct or adduct blend.

* * * * *